US012116953B2

(12) United States Patent
Steiner et al.

(10) Patent No.: US 12,116,953 B2
(45) Date of Patent: Oct. 15, 2024

(54) THERMAL REGENERATOR APPARATUS

(71) Applicant: ETALIM INC., Burnaby (CA)

(72) Inventors: Thomas Walter Steiner, Burnaby (CA); Geoffrey Donald Stalker Archibald, Vancouver (CA); Timothy John Henthorne, Vancouver (CA); Michael Peter Hoy, Burnaby (CA); Takao Kanemaru, Port Coquitlam (CA)

(73) Assignee: ETALIM INC., Burnaby (CA)

( * ) Notice: Subject to any disclaimer, the term of this patent is extended or adjusted under 35 U.S.C. 154(b) by 408 days.

(21) Appl. No.: 17/441,887

(22) PCT Filed: Feb. 18, 2020

(86) PCT No.: PCT/CA2020/050206
§ 371 (c)(1),
(2) Date: Sep. 22, 2021

(87) PCT Pub. No.: WO2020/191479
PCT Pub. Date: Oct. 1, 2020

(65) Prior Publication Data

US 2022/0186680 A1 Jun. 16, 2022

Related U.S. Application Data

(60) Provisional application No. 62/825,592, filed on Mar. 28, 2019.

(51) Int. Cl.
*F02G 1/057* (2006.01)
*F28D 17/02* (2006.01)

(52) U.S. Cl.
CPC ............ *F02G 1/057* (2013.01); *F28D 17/02* (2013.01)

(58) Field of Classification Search
CPC ........... F02G 1/057; F28D 17/02; F28F 3/086
See application file for complete search history.

(56) References Cited

U.S. PATENT DOCUMENTS 2,655,366 A * 10/1953 Stanley .................. F28D 17/02
165/9.3
3,183,963 A * 5/1965 Mondt .................... F28D 17/02
165/DIG. 42

(Continued)

FOREIGN PATENT DOCUMENTS

DE 19733275 A1 * 2/1999 .............. B01J 19/32
GB 663537 12/1951

(Continued)

OTHER PUBLICATIONS

Machine translation of DE-19733275-A1; retrieved Jan. 11, 2024 (Year: 2024).*

(Continued)

*Primary Examiner* — Eric S Ruppert
*Assistant Examiner* — Hans R Weiland
(74) *Attorney, Agent, or Firm* — Yiwen Artemis Lai

(57) ABSTRACT

A thermal regenerator apparatus is disclosed including a regenerator medium having a plurality of flow passages extending between first and second ports, the flow passages facilitating back and forth fluid flow in a generally transverse direction between the first and second ports while the medium alternatively receives thermal energy from and delivers thermal energy to the fluid. The regenerator medium includes a plurality of overlying foils, each foil having a plurality of channels extending through the foil, the channels having beveled sidewalls. The channels have a width and spacing in the transverse direction and channels in each adjacent overlying foil are transversely offset such that each channel spans between and is in fluid communication with a pair of channels in the adjacent foils and the beveled (Continued)

sidewalls of the channels redirect fluid flow between channels in adjacent foils to form the flow passages. The channels are elongated along the foil in a longitudinal direction orthogonal to the transverse direction and divided by foil bridges extending transversely, the foil bridges being sized to reduce thermal conduction through the medium in the transverse direction.

22 Claims, 5 Drawing Sheets

(56) References Cited

U.S. PATENT DOCUMENTS

| | | | | | |
|---|---|---|---|---|---|
| 3,367,406 | A | | 2/1968 | Vonk et al. | |
| 3,384,157 | A | | 5/1968 | Vonk et al. | |
| 4,200,441 | A | * | 4/1980 | Honmann | F24F 3/1423 165/10 |
| 4,209,061 | A | * | 6/1980 | Schwemin | F28F 13/06 165/10 |
| 5,429,177 | A | * | 7/1995 | Yaron | F02G 1/0445 165/10 |
| 5,797,449 | A | * | 8/1998 | Oswald | F28D 9/04 165/170 |
| 6,347,453 | B1 | * | 2/2002 | Mitchell | F25B 9/145 29/890.036 |
| 2003/0010473 | A1 | * | 1/2003 | Mitchell | F28D 17/02 165/902 |
| 2006/0048521 | A1 | * | 3/2006 | Katayama | F25B 9/14 165/4 |
| 2006/0118273 | A1 | * | 6/2006 | Qiu | F02G 1/057 165/10 |

FOREIGN PATENT DOCUMENTS

| | | |
|---|---|---|
| GB | 669040 | 3/1952 |
| GB | 724983 | 2/1955 |

OTHER PUBLICATIONS

International Search Report and Written Opinion issued by the Canadian Intellectual Property Office in connection with International Patent Application No. PCT/CA2020/050206, dated May 14, 2020, 7 pages.

* cited by examiner

THERMAL REGENERATOR APPARATUS

BACKGROUND

1. Field

This disclosure relates generally to thermal regenerators and more particularly to thermal regenerators used in thermoacoustic transducers and other applications.

2. Description of Related Art

Thermal regenerators are used in applications where a fluid is passed through flow passages of a regenerator medium and thermal energy in a heated fluid is stored within the regenerator medium and then subsequently transferred to a cold fluid passing through the regenerator. Regenerators are implemented to increase the efficiency of the apparatus in which they are deployed.

Thermoacoustic transducers that implement a closed Stirling cycle with a gaseous working fluid may be configured to operate as a heat engine in which thermal energy is received and the transducer converts the thermal energy into mechanical energy. Alternatively a thermoacoustic transducer may be configured to operate as a heat pump where mechanical energy is received and the transducer converts the mechanical energy into a thermal energy transfer from lower temperature to higher temperature. Regenerators are key enabling components in thermoacoustic transducers.

SUMMARY

In accordance with one disclosed aspect there is provided a thermal regenerator apparatus including a regenerator medium having a plurality of flow passages extending between first and second ports, the flow passages facilitating back and forth fluid flow in a generally transverse direction between the first and second ports while the medium alternatively receives thermal energy from and delivers thermal energy to the fluid. The regenerator medium includes a plurality of overlying foils, each foil having a plurality of channels extending through the foil, the channels having beveled sidewalls. The channels have a width and spacing in the transverse direction and channels in each adjacent overlying foil are transversely offset such that each channel spans between and is in fluid communication with a pair of channels in the adjacent foils and the beveled sidewalls of the channels redirect fluid flow between channels in adjacent foils to form the flow passages. The channels are elongated along the foil in a longitudinal direction orthogonal to the transverse direction and divided by foil bridges extending transversely, the foil bridges being sized to reduce thermal conduction through the medium in the transverse direction.

The adjacent overlying foils may be oriented to cause the respective bevels of the channel sidewalls to be oriented in a common direction.

The adjacent overlying foils may be oriented to cause the respective bevels of the channel sidewalls to be oriented in alternating directions.

The beveled sidewalls of the plurality of channels are angled inwardly such that an opening at a first surface of the foil may be larger than an opening at a second surface of the foil.

The beveled sidewalls of the plurality of channels have a concave profile.

The beveled sidewalls of the plurality of channels have a convex profile.

An angle of the beveled sidewall may be selected to permit foil portions defining the channels from adjacent foils to overlap in the transverse direction thereby increasing a volume proportion of the foil portions with respect to a volume of the channels.

The foil may include one or more lengths of foil would around a cylindrical spool to provide the overlying foils resulting in a regenerator medium having a hollow cylindrical shape.

The cylindrical spool may have a central bore sized to accommodate other elements of a system in which the thermal regenerator apparatus is installed.

The adjacent foils may include a first foil having a first foil pattern including channels disposed at a first offset with respect to a first longitudinal reference on the foil, a second foil having a second foil pattern including channels disposed at a second offset with respect to a second longitudinal reference on the foil, and wherein, when the first and second foils are wound together around the cylindrical spool with the first and second longitudinal references aligned, the channels of the first foil are transversely offset with respect to the channels of the second foil.

The first and second longitudinal references may include an edge of the respective first and second foils.

The plurality of overlying foils may be bonded together by a diffusion bonding process.

The apparatus may include a cylindrical sleeve enclosing and sealing the regenerator medium, the cylindrical sleeve having thin walls to reduce thermal conduction in the transverse direction.

The regenerator medium may be bonded in the cylindrical outer sleeve by one of a brazing process, a welding process, and an adhesive applied to a near ambient temperature side of regenerator medium.

The apparatus may include a length of foil without flow channels overlying an outermost foil of the regenerator medium and operable to enclose and seal the cylindrical shaped regenerator medium.

The cylindrical spool may include a thin walled tube operable to reduce thermal conduction in the transverse direction.

Fluid flow through a central bore of the thin walled tube may be prevented by one of an end cap, a porous medium disposed within the central bore that provides a similar or higher fluid flow resistivity than the fluid flow resistivity through the regenerator medium, a wire felt disposed within the central bore that provides a similar or higher fluid flow resistance than the fluid flow resistance through the regenerator medium, a solid material disposed within the central bore and having a low thermal conductivity, and a ceramic material disposed within the central bore.

The channels may be offset in the longitudinal direction to cause the transverse foil bridges to be offset in the longitudinal direction to further reduce thermal conduction in the transverse direction.

A length of the channels in the longitudinal direction may be varied to cause the transverse foil bridges to form a bracing pattern that increases a lateral stiffness of the foil.

The transverse foil bridges are longitudinally offset such that the bracing pattern may be substantially aligned at about 45° to the transverse direction.

Each of the plurality of overlying foils may include one of a foil substrate having channels etched through the substrate, and a foil formed by electroforming a material to provide foil portions defining the plurality of channels.

The foil may include one of a stainless steel foil, an Inconel foil, a titanium foil, and a non-metallic foil.

The width and spacing of the channels may include one of a regular width and spacing across the transverse direction of the regenerator medium, and a variation of at least one of the width and the spacing of the channels across the transverse direction of the regenerator medium to compensate for changes in fluid conductivity and viscosity between a cold side and a hot side of the regenerator medium.

In accordance with another disclosed aspect there is provided a method for fabricating a thermal regenerator medium having a plurality of flow passages extending between first and second ports, the flow passages facilitating back and forth fluid flow in a generally transverse direction while the medium alternatively receives thermal energy from and delivers thermal energy to the fluid. The method involves providing first and second foils, each foil having a plurality of channels extending through the foil and having beveled sidewalls, the channels having a width and spacing in the transverse direction. The first foil has a first foil pattern including channels disposed at a first offset with respect to a first longitudinal reference on the foil and the second foil has a second foil pattern having channels disposed at a second offset with respect to a second longitudinal reference on the foil. The channels are elongated in a longitudinal direction orthogonal to the transverse direction and being divided by foil bridges extending transversely and sized to reduce thermal conduction through the medium in the transverse direction. The method further involves aligning the first and second longitudinal references of the respective first and second foils such that the channels of the first foil are transversely offset to span between and be in fluid communication with the channels of the second foil, and winding first and second foils around a cylindrical spool to produce a generally cylindrical shaped regenerator medium.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
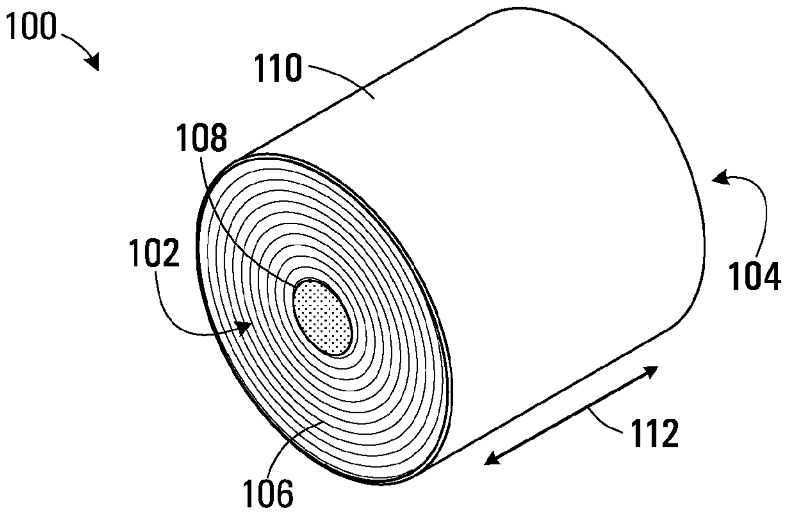
FIG. 1 is a perspective view of a thermal regenerator apparatus in accordance with a first disclosed embodiment.

Referring to FIG. 1, a thermal regenerator apparatus according to a first disclosed embodiment is shown generally at 100. The regenerator apparatus 100 includes a first port 102 and a second port 104 and a regenerator medium 106 extending between the first and second ports. The regenerator apparatus 100 includes a central cylindrical spool 108 and outer cylindrical sleeve 110, which encloses and seals the regenerator medium 106.

The regenerator apparatus 100 may be used to implement a regenerator portion of a thermal converter in a thermoacoustic transducer apparatus such as described in commonly owned PCT patent publication WO/2018/094500 entitled "APPARATUS FOR PERFORMING ENERGY TRANSFORMATION BETWEEN THERMAL ENERGY AND ACOUSTIC ENERGY" filed on 20 Oct. 2017 and incorporated herein by reference in its entirety. The above referenced publication describes a thermal converter comprising a plurality of discrete cylindrical thermal converters, each having a cylindrical regenerator having fluid flow passages extending through the regenerator between fluid ports. The regenerator apparatus 100 may be used to implement the regenerator disclosed in WO/2018/094500 or may be used in a variety of other applications for thermal regenerators. For example, thermal regenerators are used in thermoacoustic transducers that convert thermal energy into mechanical energy or vice versa.

Figure 2:
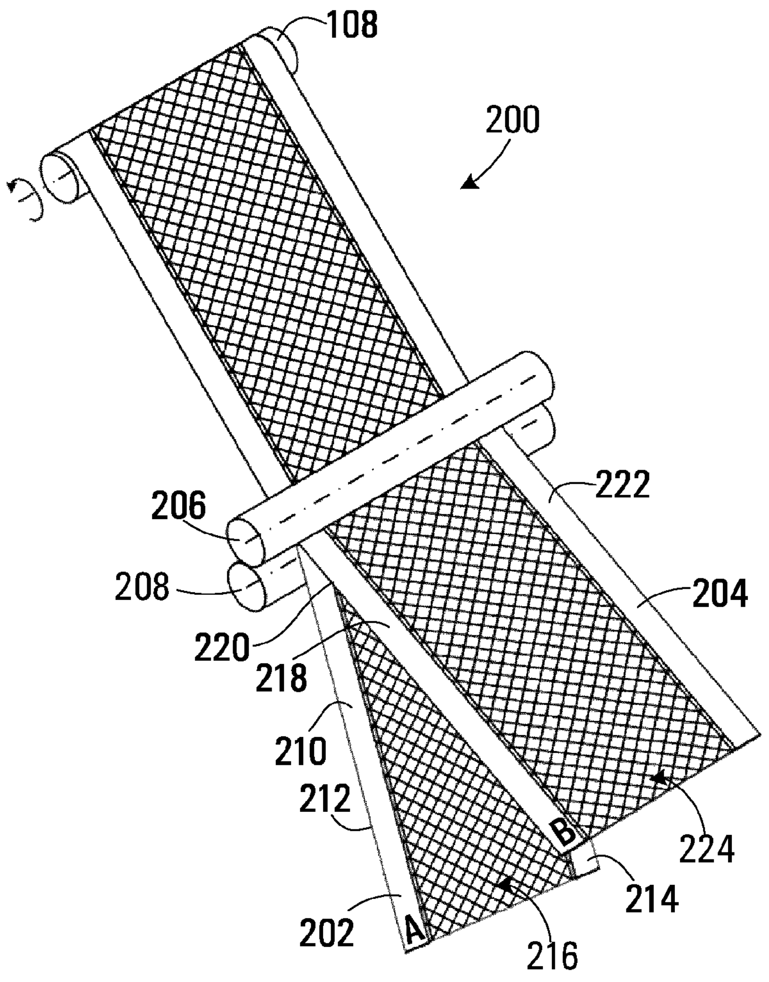
FIG. 2 is a portion of a winding machine for producing a regenerator medium of the thermal regenerator shown in FIG. 1.

Referring to FIG. 2, in the embodiment shown the regenerator medium 106 is fabricated from elongate strips of patterned metal foil wound about the cylindrical spool 108 in a foil winding machine (a portion of which is shown schematically at 200 in FIG. 2). The cylindrical spool 108 is coupled to a rotational drive of the foil winding machine 200 and the in this embodiment first and second adjacent foils 202 and 204 are guided through rollers 206 and 208 and are wound together around the cylindrical spool. The foil winding machine 200 may be a customized machine similar to winding machines used for producing electrolytic capacitors, which require winding of precisely aligned foils. In this embodiment the first foil 202 has a first header strip 210 at a first edge 212 of the foil, a second header strip 214 at the second edge of the foil, and a patterned region 216 between the respective header strips. Similarly the foil 204 has a first header strip 218 at a first edge 220 of the foil, a second header strip 222 at the second edge of the foil, and a patterned region 224 between the respective header strips. The header strips 210, 214, 218, and 222 facilitate handling of the foils 202 and 204 during patterning and winding. In other embodiments the foils 202 and 204 may have a single header strip at the first edges 212 and 220, or the header strips may be omitted entirely. The first foil 202 is marked A to indicate that the foil has a patterned region 216 of pattern type A, while the second foil 204 is marked B to indicate that the foil has a patterned region 224 of pattern type B.

Figure 3:
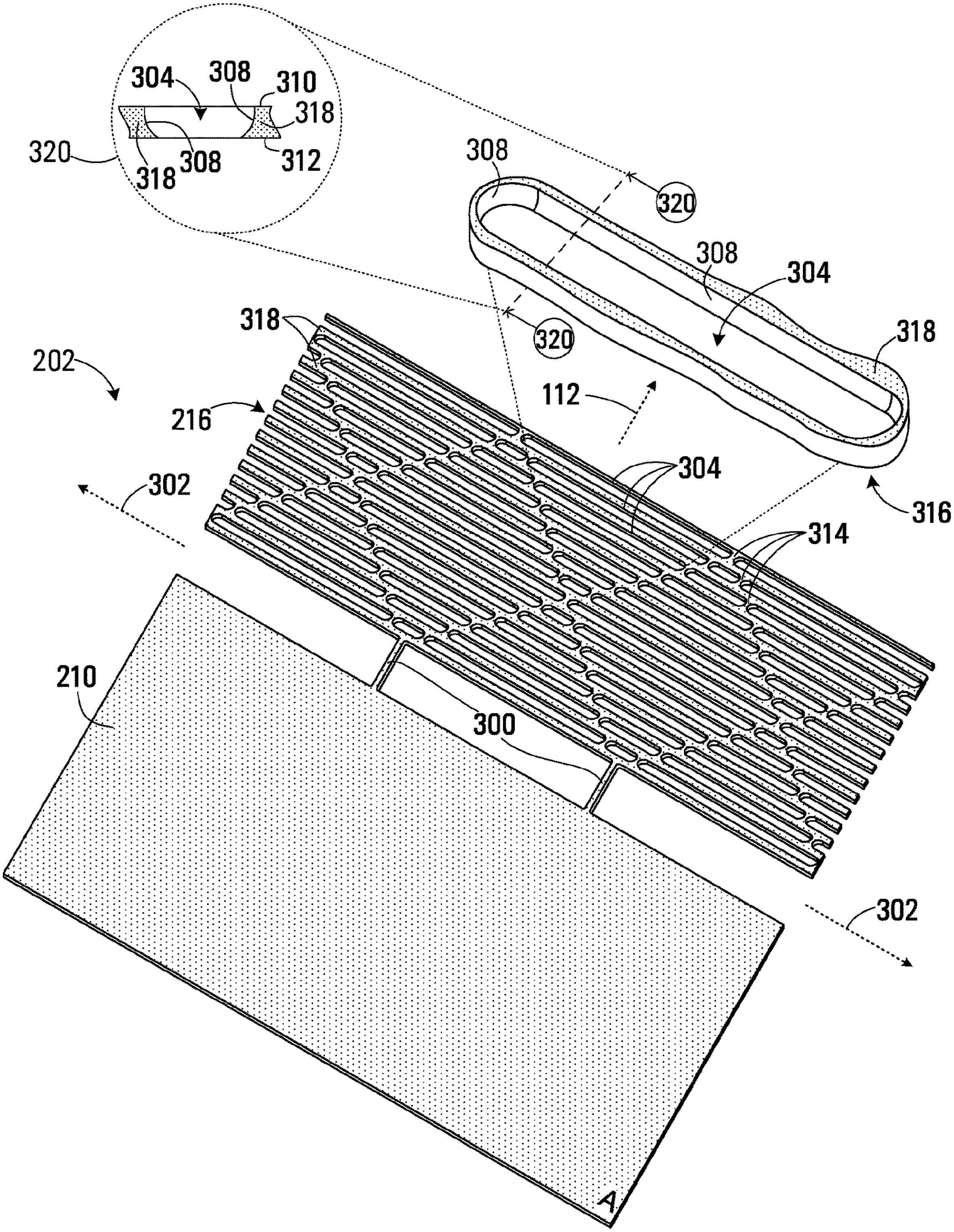
FIG. 3 is a perspective view of a portion of a first foil having a first pattern for producing the regenerator medium shown in FIG. 1.

A portion of the first foil 202 (pattern A) is shown in perspective view in FIG. 3. Referring to FIG. 3, the header strip 210 is joined to the patterned region 216 by a plurality of transversely extending tabs 300. The foil 202 extends longitudinally in the direction of arrows 302 (orthogonal to the transverse direction 112). In typical embodiments, a completed regenerator apparatus 100 may have a length of about 10 meters or more of each of the first foil 202 and the second foil 204 wound together onto the spool 108. The patterned region 216 has a pattern that repeats across the foil in the transverse direction 112 between the two header strips 210 and 214. The pattern also repeats along the length of the foil in the longitudinal direction 302.

The patterned region 216 of the foil 202 includes a plurality of channels 304 extending through the foil. One of the channels 304 is shown enlarged in a first insert 316 to FIG. 3. The channel 304 is formed through the foil 202 leaving foil portions 318 between adjacent channels (the foil portions 318 are shown surrounding the channel in the insert 316). Each channel 304 has beveled sidewalls 308. As shown in a cross-section insert 320, the openings to the channels in an upper surface 310 of the foil 202 in this embodiment are larger in size than the openings to the channel in a lower surface 312 of the foil and the sidewalls 308 have a concave profile. The channels 304 are also elongated in length along the foil 202 in the longitudinal direction 302 and are divided by a plurality of foil bridges 314 extending transversely across the foil 202. The foil bridges 314 provide transverse bracing between adjacent channels 304 such that the foil 202 retains its shape for handling and while being wound in the foil winding machine 200.

In one embodiment the patterned foils may be fabricated by chemical etching of a stainless steel foil using an etch resist to define the channel layout. By controlling the etch process a desired angle and profile of the beveled sidewall 308 may be targeted. Through implementation of a continuous etch process, the foils are fabricated in long lengths that may be used in the foil winding machine 200 to wind multiple regenerators. Custom patterned foils are available from various suppliers including Lancaster Metals Science Co. of Lancaster PA, USA. While less common, other methods of fabricating the foils may be employed including electroforming. The foil may be a metallic foil fabricated using metals such as Inconel, nickel, or titanium. In other embodiments the foil may be fabricated from a non-metallic material such as plastic.

Regenerators often operate with a large temperature gradient between the first port 102 and the second port 104 and in the embodiment shown the foil bridges 314 are sized to reduce thermal conduction through the foil 202 in the transverse direction 112, while still providing adequate transverse bracing in the patterned region 216 of the foil. The length of the channels 304 in the longitudinal direction may be selected to cause the transverse foil bridges 314 to be offset in the longitudinal direction 302. In this embodiment the bridges 314 are offset to form a bracing pattern generally aligned at an angle of about 45° to the transverse direction 112 by varying the longitudinal length of adjacent channels 304 in the foil 202. The offset of the transverse foil bridges 314 in the longitudinal direction 302 have the advantage of making the foil easier to handle during winding. The offset between the foil bridges 314 further reduces thermal conduction through the foil 202 in the transverse direction. Transverse heat flow is primarily through the foil portions 318 along a path that is diverted longitudinally at each foil bridge 314, thus increasing the thermal path length and thus reducing transverse conduction across the foil.

In other embodiments the offset of the transverse foil bridges 314 in the longitudinal direction 302 may form bracing patterns at angles other than 45°, or the adjacent channels may have the same longitudinal length such that the foil bridges are aligned across the transverse width of the foil.

Figure 4:
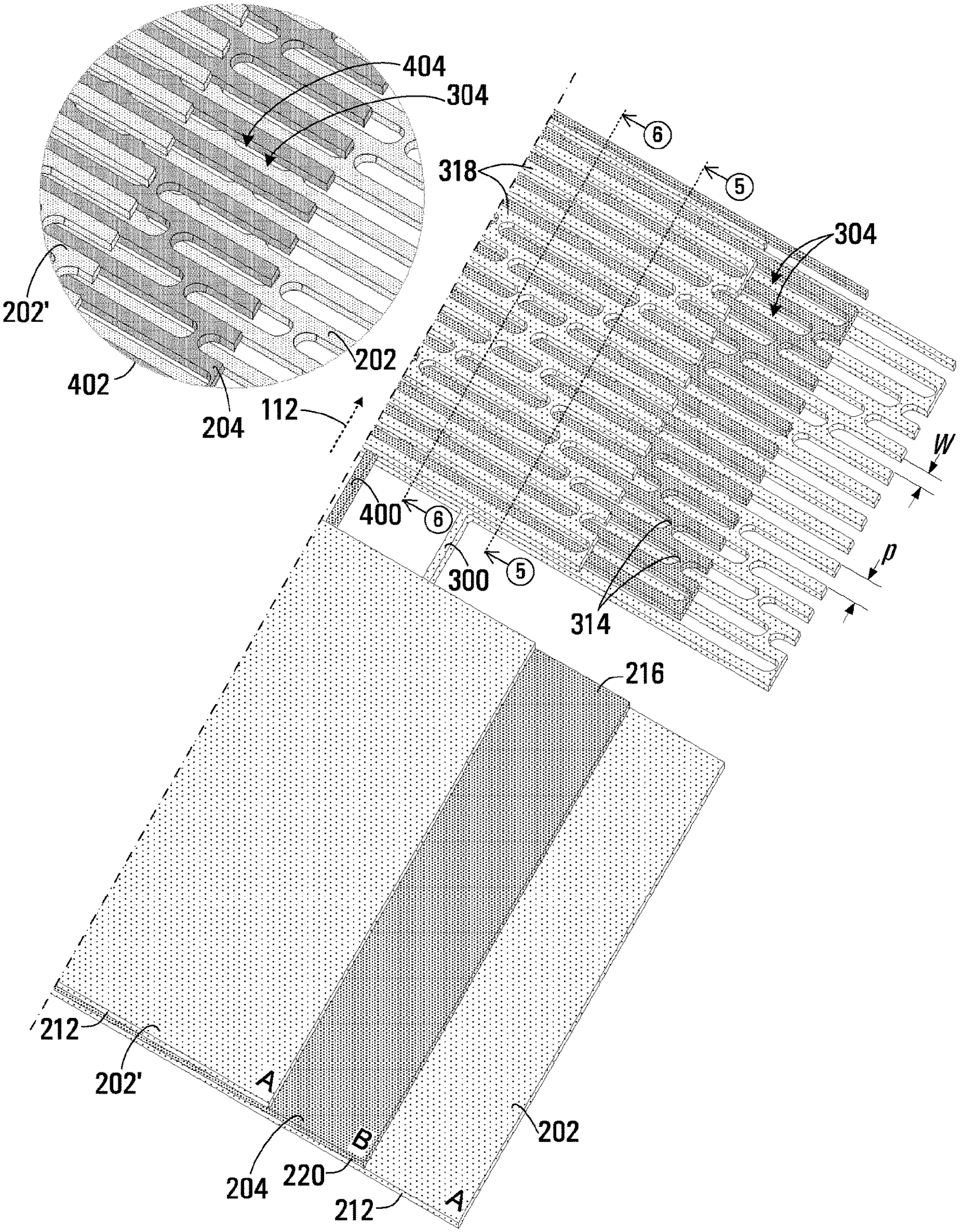
FIG. 4 is a perspective view of a portion of three overlying foils for producing the regenerator medium shown FIG. 1.

Referring to FIG. 4, three foils are shown overlying each other including the first foil 202 (A), the second foil 204 (B) overlying the first foil and another first foil 202' (A) overlying the second foil. When the regenerator medium 106 is wound using the foil winding machine 200 shown in FIG. 2, the adjacent overlying foil layers will alternate between pattern A and pattern B. The second foil 204 having pattern B has the header strip 218 joined to the patterned region 224 by a plurality of transversely extending tabs (of which one is shown at 400 in FIG. 4). The patterned region 224 for the pattern B foil 204 has the same sizing and layout of channels 304 and foil bridges 314 as the pattern A foil. However the tabs 400 for the pattern B foil 204 are longer than the tabs 300 associated with the pattern A foils 202 and 202' by half of a pattern pitch p between the channels 304. When the foils 202 and 204 are wound on the foil winding machine 200 with the edges 212 and 220 aligned, the adjacent overlying foils A and B are transversely offset from each other such that each channel 304 spans between and is in fluid communication with a pair of channels in the adjacent foils. In this embodiment the channels 304 have a regular width W and spacing or pitch p in the transverse direction 112 and channels in each adjacent overlying foil 202, 204 and 202' are transversely offset such that each channel spans between and is in fluid communication with a pair of channels in the adjacent foils. The beveled sidewalls 308 of the channels 304 redirect fluid flow between channels in adjacent foils to form the flow passages of the regenerator medium 106. The foil bridges 314 space adjacent foils apart by exactly the foil thickness thereby tightly controlling the height of the channels 304.

In the embodiments shown, the channels 304 in the transverse direction 112 of the regenerator medium 106 are all shown having a regular width and spacing. However in other embodiments, a variation of at least one of the width and the spacing of the channels 304 in the transverse direction 112 may be implemented to compensate for changes in fluid conductivity and viscosity between a cold side and a hot side of the regenerator medium 106. In this case the foil patterns may be selected to provide a small change in width and/or spacing of channels from the hot side to the cold side of the regenerator medium 106 to compensate for the changed viscosity and conductivity of the fluid with temperature.

The edges 212 and 220 thus act as first and second longitudinal references for precisely aligning the foils for winding. As best shown in the enlarged insert 402, the foil pattern B of the foil 204 causes the channels 304 to be disposed at a first offset with respect to the reference edge 220, while the foil pattern A of foils 202 and 202' causes the respective channels to be disposed at a second offset with respect to the reference edge 212 on the foils such that the channels in adjacent foils are transversely offset. This causes the channels 304 in the in the foil 204 to be in fluid communication with a channel in the foil 202 below via an overlapping portion 404 of the channels. Similar fluid communication also occurs between the foil 202' and the foil 204.

Following winding of the regenerator medium 106 on the cylindrical spool 108 to produce the desired diameter of regenerator medium 106, the header strips 210, 214, 218, and 222 are separated from the patterned regions 216 and 224 at the tabs 300 and 400 to provide the first port 102 and the second port 104. The regenerator medium 106 thus has an annular cylindrical shape with the cylindrical spool 108 at the center. The wound regenerator medium 106 may be subjected to a diffusion bonding process that effectively bonds the foils together to form a unitary structure. Within the regenerator medium 106, the foil bridges 314 provide points of contact between foil layers that facilitate the diffusion bonding of the regenerator medium into a unitary structure.

In the embodiment shown in FIG. 1, the regenerator apparatus 100 is enclosed by the outer cylindrical sleeve 110, which seals the regenerator medium 106 to prevent escape of fluid through the sides. The regenerator medium 106 may be diffusion bonded in the outer cylindrical sleeve 110 or may be bonded into the sleeve using a brazing or welding process. Alternatively, the regenerator medium 106 may be bonded to the outer cylindrical sleeve 110 using an adhesive applied at the near ambient temperature side of the regenerator apparatus 100. In other embodiments a length of un-patterned foil without flow channels may be used overlying an outermost patterned foil of the regenerator medium to enclose and seal the cylindrical shaped regenerator medium.

The outer cylindrical sleeve 110 is generally implemented as a thin walled sleeve to reduce thermal conduction along the sleeve in the transverse direction 112 between the first port 102 and the second port 104. In one embodiment the outer cylindrical sleeve 110 may be an Inconel material. Similarly the cylindrical spool 108 may also be a thin walled tube having an open central bore to reduce thermal conduction in the transverse direction 112. Fluid flow through the central bore of the cylindrical spool 108 may be prevented by capping the ends of the central bore. Alternatively a porous medium may be disposed within the central bore that provides a similar or higher fluid flow resistivity than the fluid flow resistivity through the regenerator medium. For example a wire felt may be disposed within the central bore. In other embodiments flow may be blocked by a solid material disposed within the central bore having a low thermal conductivity, such as a ceramic material.

In the embodiment shown in FIG. 1, the cylindrical spool 108 may be selected to have a convenient diameter for mounting in the foil winding machine 200 shown in FIG. 2. However in other embodiments, the cylindrical spool may be increased in diameter such that the cylindrical spool 108 has an increased inside diameter. The central cylindrical void provided by the larger cylindrical spool may be used to accommodate other elements of a system such as a thermoacoustic transducer within which the regenerator apparatus is installed. For example, in some Stirling Engine embodiments, cylinder elements may be disposed within the bore of a larger diameter hollow cylinder regenerator medium.

The patterned regions 216 and 224 being offset from each other provide flow passages extending between the first port 102 and the second port 104 in a generally transverse direction indicated by the arrow 112 in FIG. 1. The flow passages facilitate back and forth fluid flow through the regenerator medium 106 which alternatively receives thermal energy from and delivers thermal energy to the fluid. In one embodiment where the regenerator apparatus 100 is used in a thermoacoustic transducer, the fluid may be pressurized helium gas and the fluid flow oscillates back and forth at a frequency of 250 Hz or greater.

Figures 5, 6, 7, 8:
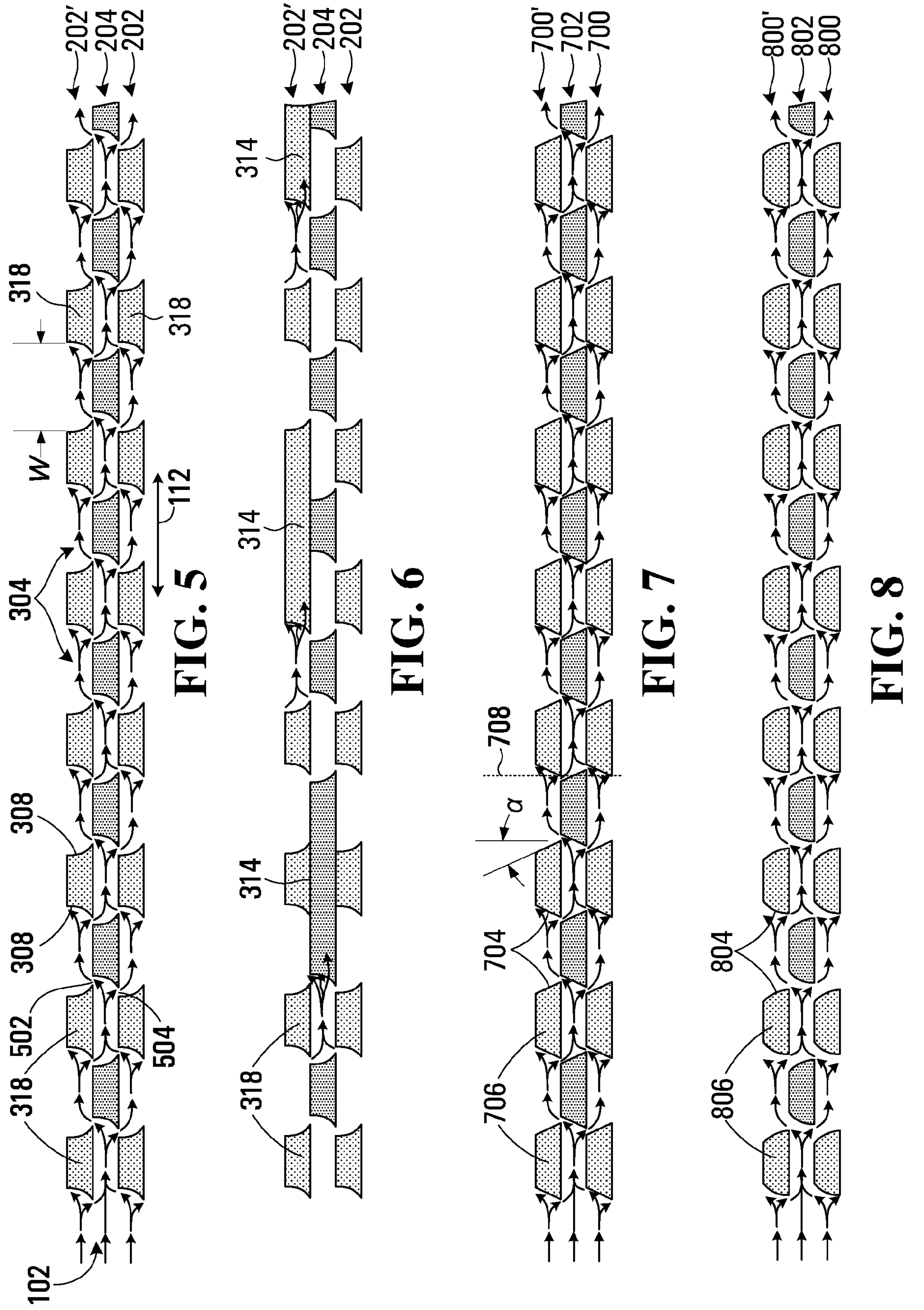
FIG. 5 is a schematic view of a cross sectional plane taken through the overlying foils along the line 5-5 in FIG. 4.
FIG. 6 is a schematic view of a cross sectional plane taken through the overlying foils along the line 6-6 in FIG. 4.
FIG. 7 is a schematic cross sectional view of another disclosed embodiment of a regenerator medium.
FIG. 8 is a schematic cross sectional view of a further disclosed embodiment of a regenerator medium.

Referring to FIG. 5, the foil portions 318 of the foils 202, 204, and 202' are shown for a cross-sectional plane taken transversely along line 5-5 in FIG. 4. Only the three adjacent foils shown in FIG. 4 are depicted in FIG. 5, but it should be understood that many adjacent foil layers make up a regenerator. For example about 250 foils of each of the foil patterns A and B will make up the windings of a regenerator medium 106 for a 30 millimeter diameter regenerator 100 having a foil thickness of about 25 μm. In other embodiments the foil may have a greater or lesser thickness depending on operating temperature range, pressure, frequency and working gas type. Foil portions 318 that define the channels 304 and beveled sidewalls 308 are shown shaded to correspond with the shading in FIG. 4.

The fluid flow through the portion of regenerator medium 106 in FIG. 5 is shown by a series of arrows entering the first port 102 and flowing from left to right. However it should be understood that fluid flow periodically reverses direction and will flow from right to left. When the fluid flow encounters one of the beveled sidewalls 308 the fluid is redirected to flow through respective openings 502 and 504 into adjacent channels 304 in the adjacent foils. The flow passages through the regenerator medium 106 are thus defined by a plurality of channels in adjacent foil layers. In one embodiment the transverse width of the channels 304 may be about 100 μm. The flow direction through the regenerator medium 106 thus constantly changes and the flow weaves between layers. Each of the beveled sidewalls 308 will cause the fluid flow to divide to flow into the channels in two adjacent foils Referring to FIG. 6, the foil portions 318 of the foils 202, 204, and 202' are shown for a cross-sectional plane taken transversely along line 6-6 in FIG. 4 that passes through some of the foil bridges 314. The foil bridges 314 provide points of contact between the adjacent foils and will be distributed longitudinally about the cylindrical spool 108 throughout the regenerator medium 106. Each channel 304 is thus supported in place in the regenerator medium 106 by two foil bridges 314 contacting foil portions 318 below and above. For example the foil bridge 314 of the foil 204 contacts the foil portions 318 of both foils 202 and 202' and the channels 304 extending into the plane of the page on either side of the foil bridge will be supported by the next foil bridge. Fluid flow through portions of the regenerator medium 106 that include foil bridges 314 is similar to the flow pattern shown in FIG. 5 except that when the fluid flow impinges on one of the foil bridges, transvers flow is partially blocked and the fluid will flow into adjacent channels and also flow longitudinally around the foil bridge (i.e. into and out of the page as shown by the arrows at the foil bridges in FIG. 6).

Advantageously since a majority of the remaining solid foil portions 318 that define the channels run longitudinally thermal conduction within the regenerator medium 106 is primarily longitudinal. Only at the foil bridges 314 is a path provided for the undesirable transverse thermal conduction in the direction of fluid flow.

Referring to FIG. 7, in an alternative embodiment foils 700, 702, and 702' have foil portions 706 with substantially straight tapered sidewalls 704, such that foil portions are generally trapezoidal in cross section. Fluid flow through the medium is generally similar to the fluid flow for the embodiment shown in FIG. 5. As illustrated by the line 708 in FIG. 7, in this embodiment the widest portions of the solid foil portions 706 in adjacent foils slightly overlap due to the angle $\alpha$ of the beveled sidewalls 704. The sidewall angle $\alpha$ may be selected to cause foil portions defining the channels from adjacent foils to at least partly overlap in the transverse direction thereby increasing a volume proportion of the foil portions with respect to a volume of the channels. In contrast, if the foil portions were shaped as regular rectangles, maintaining the same size of openings between adjacent channels would require that the overall proportion of the solid foil portions 706 be reduced with respect to the open flow passages provided by the channels, resulting in reduced solid foil and heat capacity within the regenerator medium. The embodiment shown in FIG. 5 also has an overlap of the foil portions 318, although to a lesser degree than in the FIG. 7 embodiment. In other embodiments there may be a lesser overlap of the foil portions or there may be no overlap of foil portions.

In the embodiment shown in FIG. 5, the beveled sidewalls 308 have a concave profile. Referring to FIG. 8, in another embodiment the foils 800, 802, and 802' may have foil portions 806 with beveled sidewalls 804 having a convex profile.

Figure 9:
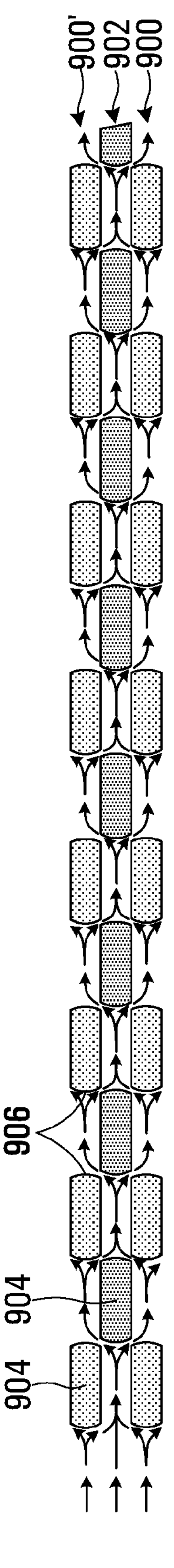
FIG. 9 is a schematic cross sectional view of yet another disclosed embodiment of a regenerator medium.

In the embodiments shown in FIGS. 5, 6, 7, and 8 the beveled sidewalls 308, 704, and 804 are not symmetric and the channel openings on the upper surface of the foils are larger than the openings on the lower surface of the foil. Referring to FIG. 9, in another embodiment foils 900, 902, and 902' have foil portions 904 having sidewalls 906 that have a concave profile that are angled symmetrically from both sides of the foil. The symmetrical sidewall profiles 906 may reduce the overall flow friction through the channels.

Figure 10:
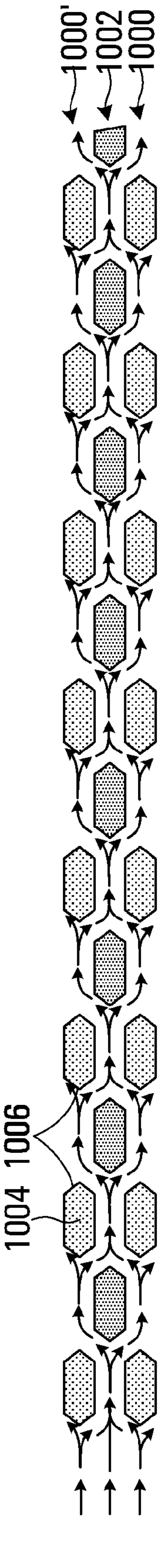
FIG. 10 is a schematic cross sectional view of another disclosed embodiment of a regenerator medium.
Figure 11:
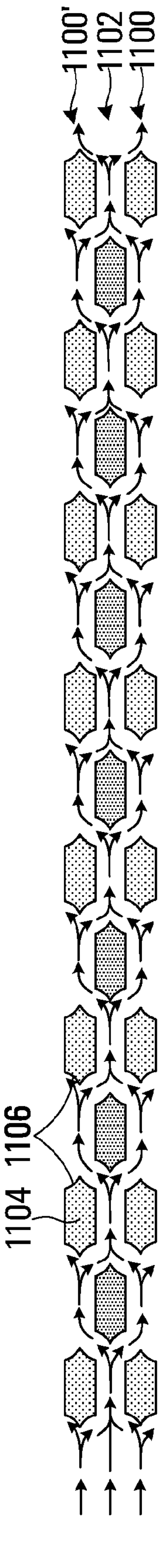
FIG. 11 is a schematic cross sectional view of yet another disclosed embodiment of a regenerator medium.

Referring to FIG. 10, in another embodiment foils 1000, 1002, and 1002' have foil portions 1004 having substantially straight tapered sidewalls 1006 that are angled symmetrically from both sides of the foil toward the center of each foil. In the embodiment shown in FIG. 10, there is no overlap between the foil portions 1004 but in other embodiments the foil portions may be extended such that there is at least a partial overlap. In yet another embodiment shown in FIG. 11, foils 1100, 1102, and 1100' have foil portions 1104 defining concave shaped sidewalls 1106 that are symmetrical with respect to upper and lower surfaces of the foils.

Figure 12:
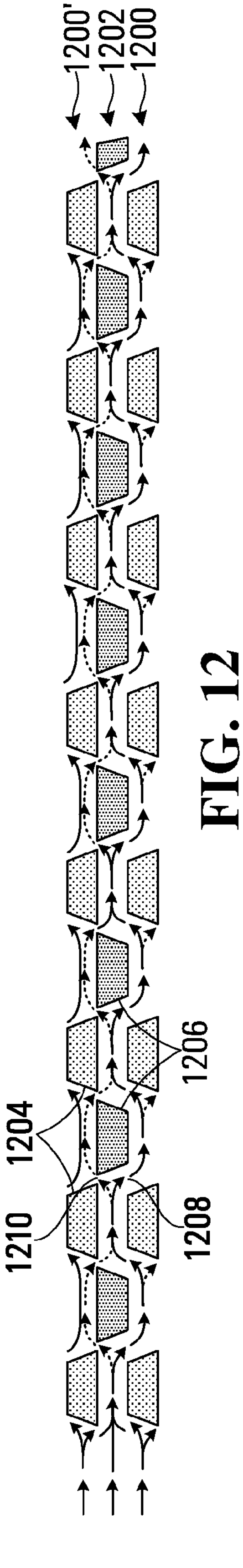
FIG. 12 is a schematic cross sectional view of another disclosed embodiment of a regenerator medium.

In the above embodiments adjacent foils are oriented to cause the respective beveled sidewalls of the channels to be oriented in a common direction. Referring to FIG. 12, in another embodiment having foils 1200, 1202, and 1200', the sidewalls 1204 of the foils 1200 and 1200' are oriented in the same direction while the sidewalls 1206 of the foil 1202 are oriented to cause the bevels of the sidewalls to be oriented in the opposite direction. The sidewall bevel directions for adjacent foils are thus in alternating directions. Fluid flow through the channels of the foils 1200 and 1202 tends to remain mostly within the adjacent channels of these foils, since the openings 1208 are larger than the openings 1210. Flows shown in broken lines from the foil 1202 through the openings 1210 into the foil 1200' are limited by the narrow opening between these adjacent channels. The predominant flows are shown in solid lines between the channels 1200 and 1202 and from a channel (not shown) above the channel 1200'. Similarly, for the foil 1200', fluid flow will tend to alternate back and forth between this foil and an overlying foil (not shown). In contrast, for the symmetric embodiments shown in FIGS. 9, 10, and 11 the solid foil portions are symmetric with respect to the upper and lower foil surfaces and thus the orientation of the foil layers during winding will not change the channel orientation.

In the above embodiments the beveled sidewalls have advantages in directing fluid flow through the regenerator medium while increasing the proportion of solid foil portions to the channels forming the flow passages. The patterning of the foils is also arranged to provide foil bridges that provide points of contact between foil layers and simplify the handling and winding of the foils, without significant impact on the flow through the regenerator medium.

While specific embodiments have been described and illustrated, such embodiments should be considered illustrative only and not as limiting the disclosed embodiments as construed in accordance with the accompanying claims.

What is claimed is:

1. A thermal regenerator apparatus including a regenerator medium having a plurality of flow passages extending between first and second ports, the flow passages facilitating back and forth fluid flow in a generally transverse direction between the first and second ports while the regenerator medium alternatively receives thermal energy from and delivers thermal energy to the fluid, the regenerator medium comprising:

a plurality of overlying foils, each foil having a plurality of channels extending through the foil, the channels having beveled sidewalls;

wherein the channels have a width and a spacing in the transverse direction and channels in each adjacent foil are transversely offset such that each channel spans between and is in fluid communication with a pair of channels in adjacent foils and the beveled sidewalls of the channels redirect fluid flow between channels in adjacent foils to form the flow passages;

wherein the channels are elongated along the foil in a longitudinal direction orthogonal to the transverse direction and divided by transverse foil bridges extending transversely, the transverse foil bridges being sized to reduce thermal conduction through the regenerator medium in the transverse direction; and wherein a length of the channels in the longitudinal direction is varied to cause the transverse foil bridges to be offset in the longitudinal direction to form a bracing pattern that increases a lateral stiffness of the foil.

2. The apparatus of claim 1 wherein adjacent foils are oriented to cause respective bevels of the beveled sidewalls to be oriented in a common direction.

3. The apparatus of claim 1 wherein adjacent foils are oriented to cause respective bevels of the beveled sidewalls to be oriented in alternating directions.

4. The apparatus of claim 1 wherein the beveled sidewalls of the plurality of channels are angled inwardly such that an opening at a first surface of the foil is larger than an opening at a second surface of the foil.

5. The apparatus of claim 1 wherein the beveled sidewalls of the plurality of channels have a concave profile.

6. The apparatus of claim 1 wherein the beveled sidewalls of the plurality of channels have a convex profile.

7. The apparatus of claim 1 wherein an angle of the beveled sidewalls is selected to permit foil portions defining the channels from adjacent foils to overlap in the transverse direction thereby increasing a volume proportion of the foil portions with respect to a volume of the channels.

8. The apparatus of claim 1 wherein the foil comprises one or more lengths of foil wound around a cylindrical spool to provide the plurality of overlying foils resulting in the regenerator medium having a hollow cylindrical shape.

9. The apparatus of claim 8 wherein the cylindrical spool has a central bore sized to accommodate other elements of a system in which the thermal regenerator apparatus is installed.

10. The apparatus of claim 8 wherein the adjacent foils comprise:

a first foil having a first foil pattern including channels disposed at a first offset with respect to a first longitudinal reference on the first foil;

a second foil having a second foil pattern including channels disposed at a second offset with respect to a second longitudinal reference on the second foil; and wherein, when the first and second foils are wound together around the cylindrical spool with the first and second longitudinal references aligned, the channels of the first foil are transversely offset with respect to the channels of the second foil.

11. The apparatus of claim 10 wherein the first and second longitudinal references comprise an edge of the respective first and second foils.

12. The apparatus of claim 8 wherein the plurality of overlying foils are bonded together by a diffusion bonding process.

13. The apparatus of claim 8 further comprising a cylindrical sleeve enclosing and sealing the regenerator medium.

14. The apparatus of claim 13 where the regenerator medium is bonded in the cylindrical sleeve by one of:

a brazing process;

a welding process; and an adhesive applied to a near ambient temperature side of the regenerator medium.

15. The apparatus of claim 8 further comprising a length of foil without flow channels overlying an outermost foil of the regenerator medium and operable to enclose and seal the regenerator medium having the hollow cylindrical shape.

16. The apparatus of claim 8 wherein the cylindrical spool comprises a tube operable to reduce thermal conduction in the transverse direction.

17. The apparatus of claim 16 wherein fluid flow through a central bore of the tube is prevented by one of:

an end cap;

a porous medium disposed within the central bore that provides a similar or higher fluid flow resistivity than fluid flow resistivity through the regenerator medium;

a wire felt disposed within the central bore that provides a similar or higher fluid flow resistance than fluid flow resistance through the regenerator medium;

a solid material disposed within the central bore and having a low thermal conductivity; and a ceramic material disposed within the central bore.

18. The apparatus of claim 1 wherein the length of the channels in the longitudinal direction is varied between adjacent channels to cause the transverse foil bridges to be longitudinally offset such that the bracing pattern is substantially aligned at about 45° to the transverse direction.

19. The apparatus of claim 1 wherein each of the plurality of overlying foils comprise one of:

a foil substrate having channels etched through the foil substrate; and a foil formed by electroforming a material to provide foil portions defining the plurality of channels.

20. The apparatus of claim 1 wherein the foil comprises one of:

a stainless steel foil;

an Inconel foil;

a titanium foil; and a non-metallic foil.

21. The apparatus of claim 1 wherein the width and the spacing of the channels comprises one of:

a regular width and spacing across the transverse direction of the regenerator medium; and a variation of at least one of the width and the spacing of the channels across the transverse direction of the regenerator medium to compensate for changes in fluid conductivity and viscosity between a cold side and a hot side of the regenerator medium.

22. A method for fabricating a thermal regenerator medium having a plurality of flow passages extending between first and second ports, the flow passages facilitating back and forth fluid flow in a generally transverse direction while the thermal regenerator medium alternatively receives thermal energy from and delivers thermal energy to the fluid, the method comprising:

providing first and second foils, each foil having a plurality of channels extending through the foil and having beveled sidewalls, the channels having a width and a spacing in the transverse direction, the first foil having a first foil pattern including channels disposed at a first offset with respect to a first longitudinal reference on the first foil and the second foil having a second foil pattern having channels disposed at a second offset with respect to a second longitudinal reference on the second foil, the channels being elongated in a longitudinal direction orthogonal to the transverse direction and being divided by transverse foil bridges extending transversely and sized to reduce thermal conduction through the regenerator medium in the transverse direction, a length of the channels in the longitudinal direction being varied to cause the transverse foil bridges to be offset in the longitudinal direction to form a bracing pattern that increases a lateral stiffness of the foil;

aligning the first and second longitudinal references of the respective first and second foils such that the channels of the first foil are transversely offset to span between and be in fluid communication with the channels of the second foil; and winding first and second foils around a cylindrical spool to produce the thermal regenerator medium having a generally cylindrical shape.

* * * * *